US012645206B2

(12) United States Patent
Matai et al.

(10) Patent No.: US 12,645,206 B2
(45) Date of Patent: Jun. 2, 2026

(54) ANOMALY DETECTION USING ROOT CAUSE ANALYSIS IN A PROBABILISTIC MULTI-COMPONENT CALIBRATED MODEL

(71) Applicant: Geminus.Al, Inc., Cambridge, MA (US)

(72) Inventors: Racheet Matai, Santa Clara, CA (US); Alex A. Gorodetsky, Ann Arbor, MI (US); Karthikeyan Duraisamy, Ann Arbor, MI (US); Nicholas C. Crabb, Sunnyvale, CA (US)

(73) Assignee: Geminus.AI, Inc., Cambridge, MA (US)

( * ) Notice: Subject to any disclaimer, the term of this patent is extended or adjusted under 35 U.S.C. 154(b) by 543 days.

(21) Appl. No.: 18/112,839

(22) Filed: Feb. 22, 2023

(65) Prior Publication Data

US 2024/0280974 A1     Aug. 22, 2024

(51) Int. Cl.
*G05B 19/418*          (2006.01)
(52) U.S. Cl.
CPC .................... *G05B 19/4184* (2013.01); *G05B 2219/31357* (2013.01)
(58) Field of Classification Search
CPC .................. G05B 19/4184; G05B 2219/31357
See application file for complete search history.

(56) References Cited

U.S. PATENT DOCUMENTS

| | | | |
|---|---|---|---|
| 8,190,418 | B1 | 5/2012 | Fender |
| 10,417,614 | B2 | 9/2019 | Johnson et al. |
| 10,564,993 | B2 | 2/2020 | Deutsch et al. |
| 10,762,475 | B2 | 9/2020 | Song et al. |
| 10,877,470 | B2 | 12/2020 | Burd et al. |

(Continued)

FOREIGN PATENT DOCUMENTS

| | | | | |
|---|---|---|---|---|
| WO | WO-2021052777 A1 | * | 3/2021 | ............. G05B 13/04 |
| WO | 2021/209432 A1 | | 10/2021 | |

(Continued)

OTHER PUBLICATIONS

PCT/US2024/016677 "International Preliminary Report on Patentability (Chapter II of the PCT)" [IPRP], Jan. 27, 2025, 42 pages, International Preliminary Examining Authority is USPTO (IPEA/US), Alexandria, Virginia.

*Primary Examiner* — Kenneth M Lo
*Assistant Examiner* — Mohammed Shafayet
(74) *Attorney, Agent, or Firm* — Mark P. Mathison

(57) ABSTRACT

A method of troubleshooting a process in an industrial plant is described in which a digital model of the industrial plant, which associates parameters with components of the industrial plant, and each parameter has a nominal range, has values selected for a specific parameter. The values extend below, within, and above the nominal range of the parameter. The digital model is executed using each of the values. Each of the values is associated with an output of the digital model, and the associations are saved in a database. Outputs associated with values within the nominal range of the parameter are distinguished from outputs associated with values extending below or above the nominal range of the parameter, and such correlations are saved in the database and called upon when troubleshooting errors in the plant.

14 Claims, 12 Drawing Sheets

(56) References Cited

U.S. PATENT DOCUMENTS

| 11,209,345 | B1 | 12/2021 | Madsen et al. | |
| 2008/0188972 | A1* | 8/2008 | Miller | G06F 18/2433 |
| | | | | 700/110 |
| 2014/0195184 | A1* | 7/2014 | Maeda | G05B 21/02 |
| | | | | 702/183 |
| 2015/0226049 | A1 | 8/2015 | Frangos et al. | |
| 2017/0323403 | A1 | 11/2017 | Johnson et al. | |
| 2020/0162354 | A1* | 5/2020 | Drees | G06N 5/022 |
| 2020/0191130 | A1* | 6/2020 | Van Der Spek | F04D 15/0088 |
| 2020/0293835 | A1 | 9/2020 | Doni et al. | |
| 2021/0110262 | A1* | 4/2021 | Schmitt | G06N 3/045 |
| 2021/0210214 | A1 | 7/2021 | Hampshire et al. | |
| 2021/0248293 | A1 | 8/2021 | Yokota et al. | |
| 2022/0092234 | A1 | 3/2022 | Karri et al. | |
| 2022/0379919 | A1 | 12/2022 | Bagschik et al. | |
| 2023/0026782 | A1 | 1/2023 | Sha et al. | |
| 2023/0034769 | A1* | 2/2023 | Chioua | G05B 13/027 |
| 2023/0120165 | A1 | 4/2023 | Hansen et al. | |
| 2024/0169121 | A1* | 5/2024 | Abu El Ata | G06F 30/20 |
| 2024/0302830 | A1* | 9/2024 | Chandratrey | G05B 19/4185 |

FOREIGN PATENT DOCUMENTS

| WO | 2022/269020 | A1 | 12/2022 |
| WO | 2023/287239 | A1 | 1/2023 |

* cited by examiner

300

301 Server
305 Memory Device
307 Instructions
302 Digital Model
304 Numerical Parameters
306 Inputs of Components
308 Outputs of Components
310 Nominal Ranges
312 First Parameter
314 Set of Values
316 Frequency
318 Nominal Plant Inputs
320 Related Outputs
303 Processing Device
322 Database

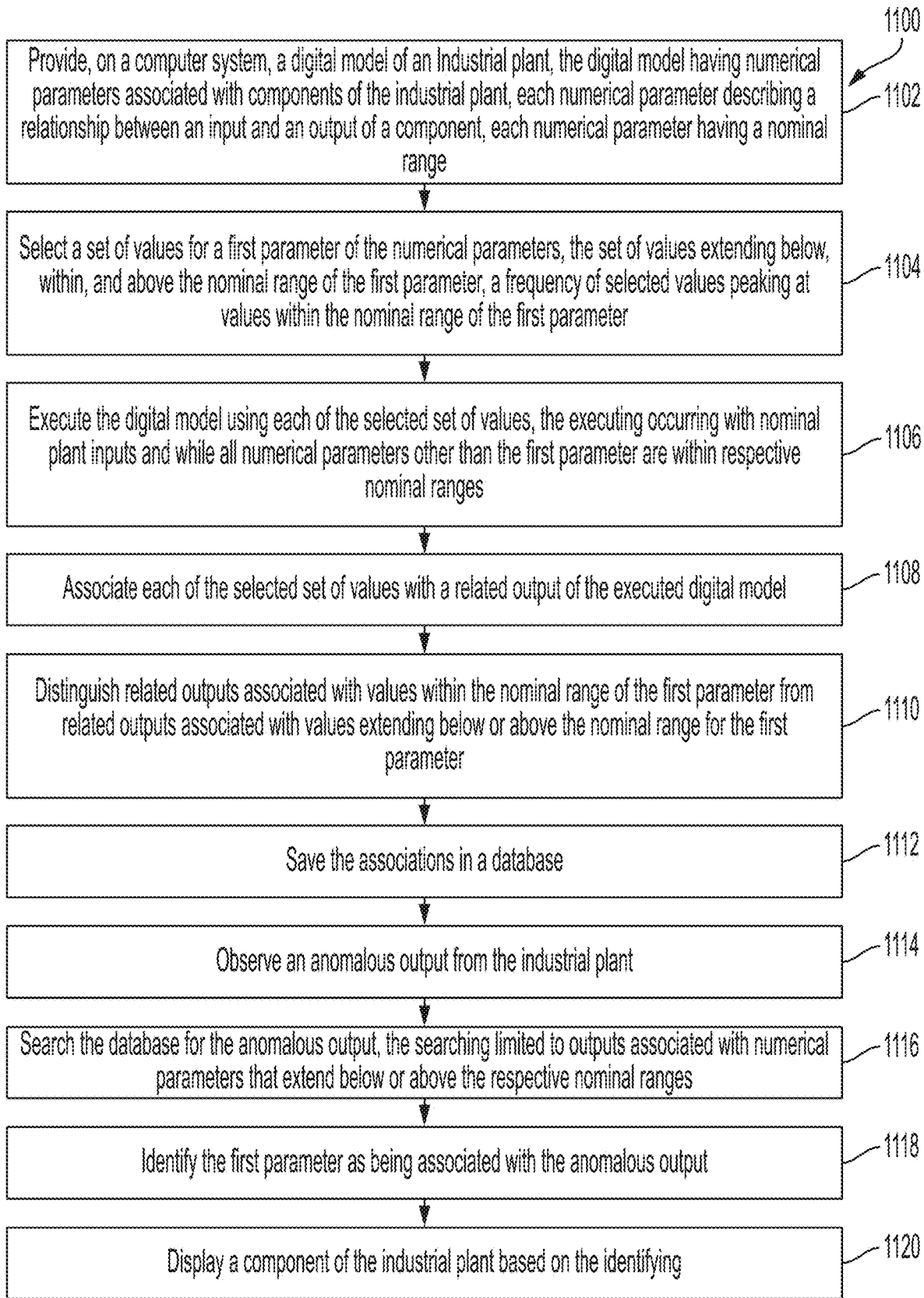

1100

1102 — Provide, on a computer system, a digital model of an Industrial plant, the digital model having numerical parameters associated with components of the industrial plant, each numerical parameter describing a relationship between an input and an output of a component, each numerical parameter having a nominal range 1104 — Select a set of values for a first parameter of the numerical parameters, the set of values extending below, within, and above the nominal range of the first parameter, a frequency of selected values peaking at values within the nominal range of the first parameter 1106 — Execute the digital model using each of the selected set of values, the executing occurring with nominal plant inputs and while all numerical parameters other than the first parameter are within respective nominal ranges 1108 — Associate each of the selected set of values with a related output of the executed digital model 1110 — Distinguish related outputs associated with values within the nominal range of the first parameter from related outputs associated with values extending below or above the nominal range for the first parameter 1112 — Save the associations in a database 1114 — Observe an anomalous output from the industrial plant 1116 — Search the database for the anomalous output, the searching limited to outputs associated with numerical parameters that extend below or above the respective nominal ranges 1118 — Identify the first parameter as being associated with the anomalous output 1120 — Display a component of the industrial plant based on the identifying

FIG. 11

ANOMALY DETECTION USING ROOT CAUSE ANALYSIS IN A PROBABILISTIC MULTI-COMPONENT CALIBRATED MODEL

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

BACKGROUND

1. Field of the Art

Embodiments of the present invention generally relate to monitoring and troubleshooting of control systems for an industrial process, specifically to quantitative model based detection methods that pre-process off-nominal component parameters.

2. Description of the Related Art

An industrial plant can be a facility, equipment, or a combination thereof used in connection with, or as part of, any process or system for industrial production or output. Examples of industrial plants can include plastic manufacturing plants, chemical plants, metal manufacturing plants, food processing plants, etc.

Digital twins can be virtual representations of real-world systems or processes. The digital twins can be a result of a culmination of technologies including artificial intelligence, physics modeling, 5G, internet of thing (IOTs), etc. For complex, real-world systems or processes, such as those performed in the industrial plants, generating an accurate digital twin can be difficult. Additionally, for a problem occurring in the complex, real-world systems or processes, it can be difficult to diagnose the problem or to replicate the problem in a digital twin.

BRIEF SUMMARY

Certain aspects and examples of the present disclosure relate to a system and method for anomaly detection using root cause analysis (RCA) in a probabilistic multi-component calibrated model. The probabilistic multi-component calibrated model can be a digital model (i.e., digital twin) of an industrial plant or of specific processes or systems associated with the industrial plant. The digital model can ingest data from sensors in the industrial plant, which can be used to calibrate parameters for the digital model. The parameters can represent components of the industrial plant via equations or other suitable numerical parameters, which can define or describe relationships between inputs and outputs of the components. After calibration, values within nominal ranges can be input for the parameters to enable the digital model to execute as a reflection of a system or process associated with the industrial plant. The nominal ranges can be values associated with expected behavior for each of the parameters. Additionally, the parameters can be calibrated for more components than data can be collected for in the industrial plant. Therefore, the digital model can facilitate increased knowledge of the industrial plant and early identification of faults in the system or process.

The anomaly detection (i.e., outlier detection or novelty detection) can be an identification of events, observations, data, or the like that deviates significantly from a majority of the data or an expected behavior of the system or process. Algorithms that can be used in anomaly detection can include z-score, support vector machines, k-nearest neighbors, or other suitable algorithms. Additionally, the RCA can be a technique or method that includes anomaly detection. The RCA can further involve determining likelihoods for the parameters, which can be a process of determining best-fitting distributions for the parameters based on data collected. Additionally, Bayesian inference can be used in the RCA as a method of statistical inference in which Bayes Theorem can be used to update the likelihoods for the parameters as new data becomes available.

The purpose of RCA can be to detect an anomaly, diagnose the anomaly, and attribute the anomaly to a specific component of the system or process. In an example, the anomaly can be detected by detecting a difference between an output of the digital model, which represents an output of the industrial plant, and a preferred value. In response, an RCA module can be executed to update likelihoods for each parameter based on the output of the industrial plant. The RCA module may further determine statistical differences between the updated likelihoods for each parameter and initial likelihoods for each parameter as established during calibration of the digital model. The component associated with a parameter with a largest statistical difference can be identified as the component causing the anomaly. Thus, the RCA model can provide an efficient technique for detecting and identifying anomalies in the industrial plant using the digital model.

Additionally, in some examples, a database can be generated with precomputed or predefined outputs of the digital model. The outputs can be associated with inputting values within the nominal ranges and outside of the nominal ranges for each of the parameters. Therefore, RCA can be performed by automatically searching the database for an output that is sufficiently close to the output from the industrial plant. The database can include a lookup table, file, relational database, or another suitable data organization method that associates the output with a parameter, a value for the parameter, other suitable information, or a combination thereof. The component associated with the parameter can be identified as the component causing the anomaly. Due to the outputs being precomputed or predefined, the database can improve efficiency of anomaly detection and identification.

Some embodiments of the invention are related to a method of troubleshooting a process in an industrial plant. The method can include providing, on a computer system, a digital model of the industrial plant or process, the digital model having numerical parameters associated with components of the industrial plant, each numerical parameter describing a relationship between an input and an output of a component, each numerical parameter having a nominal range. The method can also include selecting a set of values for a first parameter of the numerical parameters, the set of values extending below, within, and above the nominal range of the first parameter, a frequency of selected values peaking at values within the nominal range of the first parameter. Additionally, the method can include executing the digital model using each of the selected set of values, the executing occurring with nominal plant inputs and while all numerical parameters other than the first parameter are within respective nominal ranges. The method can further include associating each of the selected set of values with a related output of the executed digital model, distinguishing i) related outputs associated with values within the nominal range of the first parameter from ii) related outputs associated with values extending below or above the nominal range of the first parameter, and saving the associations in a database.

The method can include observing an anomalous output from the industrial plant, searching the database for the anomalous output where the searching can be limited to outputs associated with numerical parameters that extend below or above the respective nominal ranges, identifying the first parameter as being associated with the anomalous output, and displaying a component of the industrial plant based on the identifying. The method may further include repairing or replacing the component.

The distinguishing can include flagging the i) related outputs associated with the values within the nominal range or flagging the ii) outputs extending below or above the nominal range. The flagging can include marking, annotating, or setting aside to save in a separate portion of the database. The distinguishing can also include saving in a separate portion of the database.

The method can further include interpolating between data in the database to match the anomalous output.

The components of the industrial plant can be selected from the group consisting of a controller, a sensor, an actuator, a fluid pump, a valve, and a pipe. Additionally, at least one of the numerical parameters can be a pressure versus flow slope. The database can comprise a lookup table, a file, or a relational data base.

In some embodiments, a non-transitory computer-readable medium may store computer-executable instructions that, when executed by a processor, cause the processor to perform, and/or to instruct the components of the system to perform, any of the methods described above for troubleshooting a process in an industrial plant.

In some embodiments, a system can be provided that includes one or more processors and a memory containing instructions which, when executed on the one or more processors, cause the one or more data processors to perform any of the methods described above for troubleshooting a process in an industrial plant.

BRIEF DESCRIPTION OF THE DRAWINGS

FIG. 11 is a flowchart of process for troubleshooting a process in an industrial plant according to one example of the present disclosure.

DETAILED DESCRIPTION

Figure 1:
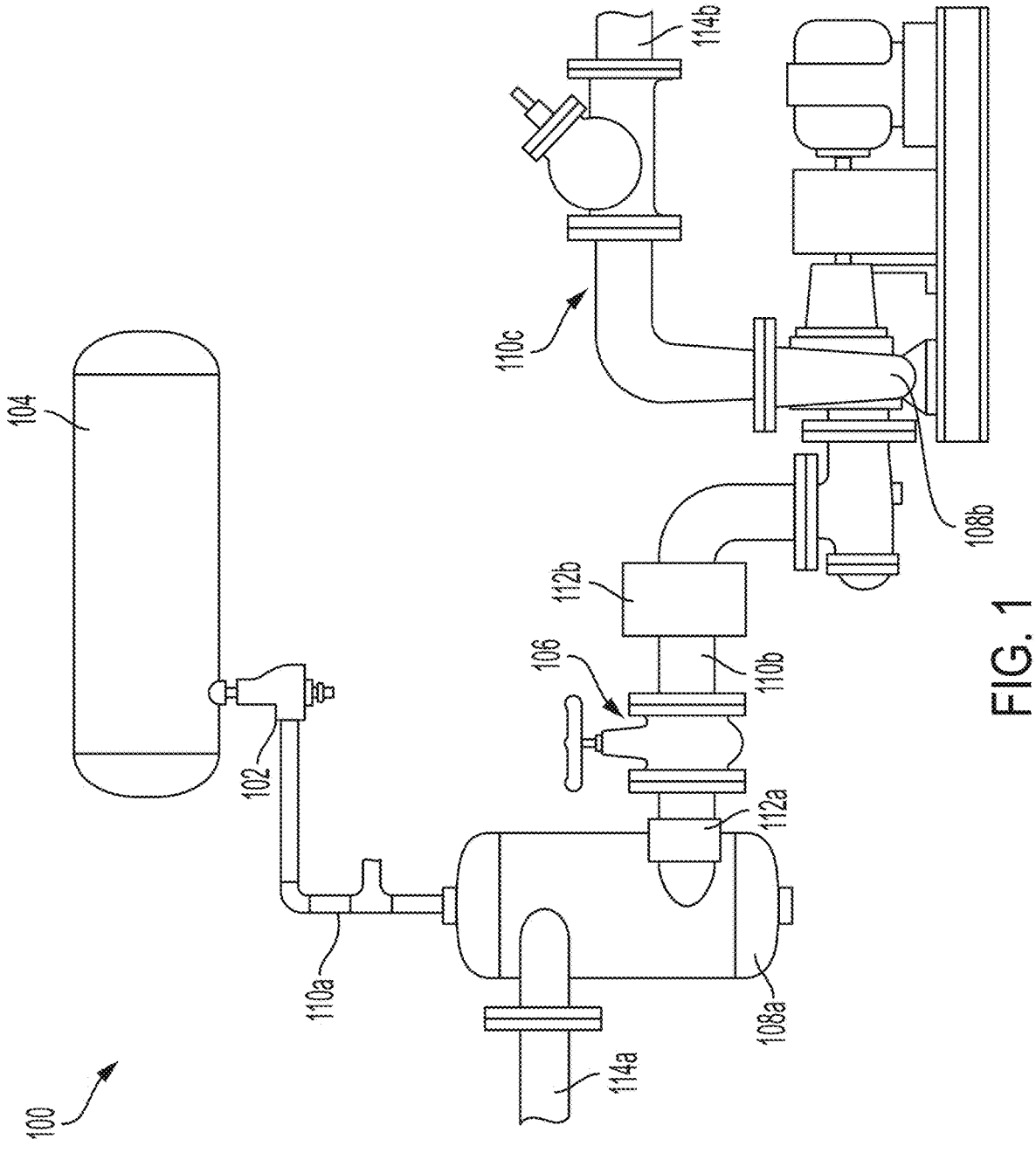
FIG. 1 is a schematic of an example of a system that can perform a process in an industrial plant according to one example of the present disclosure.

FIG. 1 is a schematic of an example of a water distribution system 100 that can perform a process in an industrial plant according to one example of the present disclosure. The process performed in the industrial plant can be a process associated with in an input of the industrial plant, a process performed within the industrial plant, or a process associated with an output of the industrial plant. In some examples, the industrial plant can be a water treatment plant for eliminating or reducing contaminants in water via a series of operations. The operations may include screening, grit removal, UV disinfection, chemical processes, and other suitable operations for generating clean water. After treatment at the water treatment plant, water distribution systems can perform one or more processes to deliver water to residential, commercial, industrial, or other suitable destinations. The water distribution systems can be part of the water treatment plant or the water distribution systems can be a separate industrial plant that can be connected to the water treatment plant. The water distribution systems can be complex networks of interconnecting pipes and may further include controllers, sensors, actuators, fluid pumps, valves, etc.

In an example, the water distribution system 100 can be a portion of a water distribution system for a residential community that can receive water from a water treatment plant and can provide the water for use at a particular residence. The water distribution system 100 can receive the water via a first connection 114a. The first connection 114a can connect to a first pump 108a for causing the water to flow toward a water storage tank 104 or toward the particular residence. The water storage tank 104 can store water, provide pressure for the water distribution system 100, or a combination thereof. For example, the water may flow through a first pipe 110a into the water storage tank 104 to be stored. In another example, the water may flow out of the water storage tank 104 through the first pipe 110a to improve or maintain water pressure of water flowing toward the particular residence. Therefore, water provided at the particular residence can be from the water storage tank 104a, the first connection 114a, or a combination thereof based on availability of water and the water pressure required at the particular residence.

Pressure and flow in the water distribution system 100 can be monitored and controlled via one or more valves, controllers, sensors, or other suitable devices. For example, a controller 102 can control pumps or other suitable devices to manage water levels in the water storage tank 104. In an example, the controller 102 may cause the first pump 108*a* to pump water to through the first pipe 110*a* and into the water storage tank 104. In another example, a first sensor 112*a* can be positioned in a second pipe 110*b*. The first sensor 112*a* may detect low water pressure, and, in response, the controller 102 may cause water to flow out of the water storage tank 104 to improve the water pressure. Additionally, a valve 106 can be a device for controlling or directing fluids flowing through a pipe. The valve 106 can be a ball valve, a gate valve, a needle valve, or another suitable valve used in water distribution systems. The valve 106 can be associated with an actuator (not depicted), which can be a device for causing a change of position with respect to the valve 106. For example, the actuator can cause the valve 106 to close when the first pump 108*a* is off or directing water to the water storage tank. In some examples, the actuator may cause the valve 106 to adjust an opening in the second pipe 110*b* in response to pressure, flow rate, or the like detected by sensors 112*a-b*.

Additionally, the water distribution system 100 may include a second pump 108*b* for causing the water to flow through a third pipe 110*c*. The third pipe 110*c* can lead to a second connection 114*b* that can be a connection to the particular residence. Therefore, the water distribution system 100 can provide clean water at the particular residence with sufficient pressure.

Figure 2:
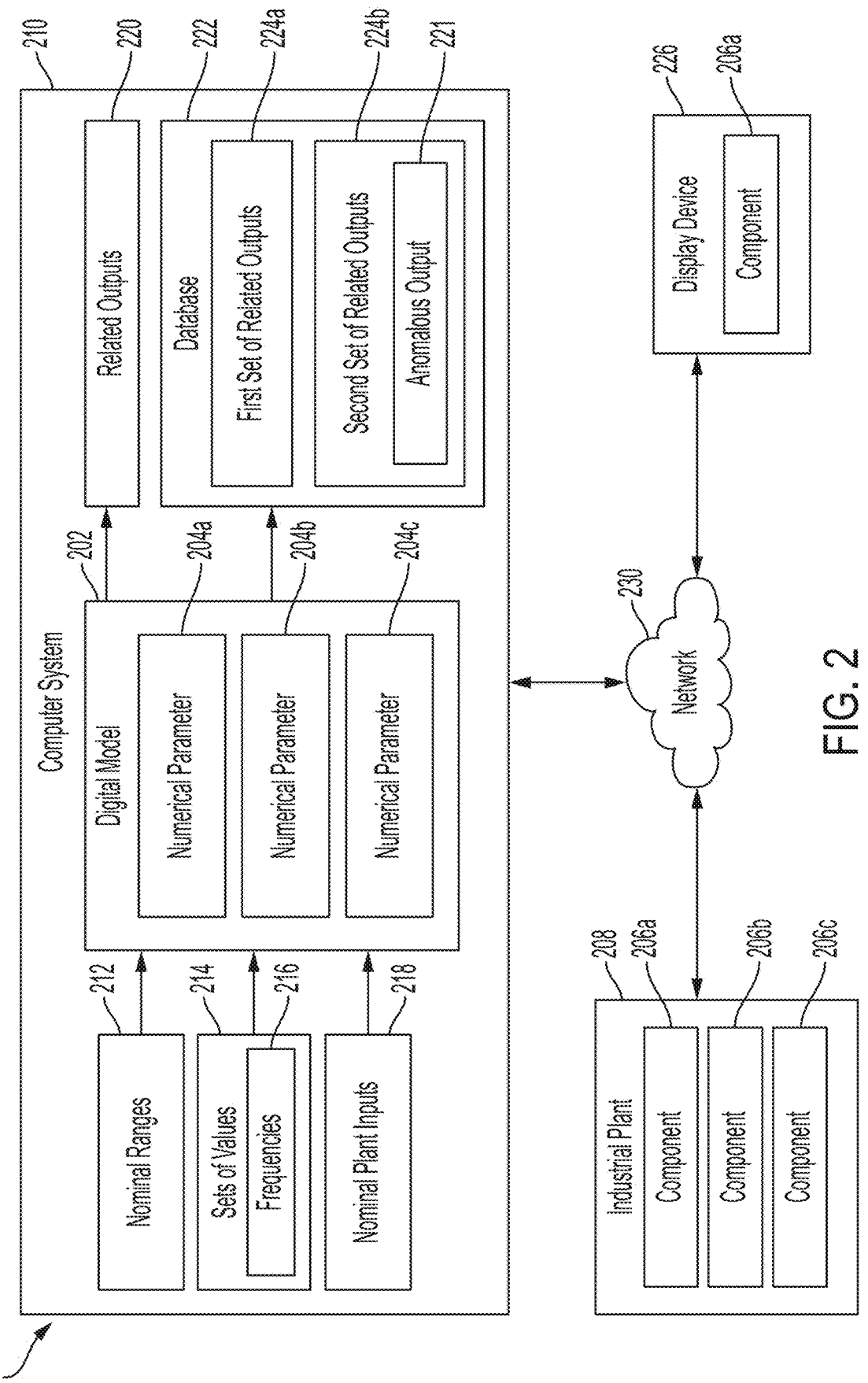
FIG. 2 is a block diagram of an example of a system for anomaly detection using root cause analysis in a probabilistic multi-component calibrated model according to one example of the present disclosure.

FIG. 2 is a block diagram of an example of a system 200 for anomaly detection using root cause analysis in a probabilistic multi-component calibrated model according to one example of the present disclosure. Aspects of FIG. 2 are discussed with respect to the components in FIG. 1. For example, the system 200 can provide, on a computer system 210, a digital model 202 of an industrial plant 208, in which the industrial plant 208 can be a water distribution system 100. In some examples, the industrial plant 208 can be a chemical plant, a metal manufacturing plant, a food processing plant, or another suitable industrial plant. Thus, the digital model 202 can be a virtual representation of the industrial plant 208 or a virtual representation of specific processes or systems associated with the industrial plant 208.

In an example, a real-world process can be distribution of water to a destination via the water distribution system 100. The digital model 202 can have numerical parameters 204*a*, 204*b*, and 204*c* associated with components 206*a*, 206*b*, and 206*c*. The components 206*a-c* can be any suitable physical portion of the industrial plant 208 that can be used in or otherwise relevant to the real-world process. The components 206*a-c* can be selected from a group of components that can include a controller, a sensor, an actuator, a fluid pump, a valve, a pipe. Thus, in the example, a first component 206*a* can be the valve, a second component 206*b* can be the pump, and a third component 206*c* can be the pipe.

The numerical parameters 204*a-c* can be calibrated to cause an output of the digital model 202 to match an expected output of the real-world process. The expected output can be associated with real-world process operating in the industrial plant 208 under normal conditions. The expected output can further be associated with an uncertainty measurement due to human error, machine error, or other suitable aspects of the real-world process that can cause tolerable variation in the expected output. To account for the uncertainty measurement, the numerical parameters 204*a-c* can have nominal ranges 212. The nominal ranges 212 can be a set of values between which the numerical parameters 204*a-c* are indicative of expected or normal behavior for the components 206*a-c*.

In some examples, the nominal ranges 212 can be determined based on a posterior distribution. The posterior distribution can be a revised or updated version of a prior distribution based on collecting data or other suitable information from the industrial plant 208. The prior distribution and the posterior distribution can be examples of likelihoods. Techniques for computing the posterior distribution can include a Kalman Filtering technique, a Markov Chain Monte Carlo method, a maximum posterior estimate, etc. The nominal ranges 212 can be values within a certain distance, such as one standard deviation, from a mean of the posterior distribution. Additionally, in some examples, the use of surrogate models can increase a computational speed of the posterior distributions or nominal ranges 212. The surrogate models can be models of the digital model 202 that can be used to estimate the prior distribution or otherwise estimate the nominal ranges 212 for the numerical parameters 204*a-c*.

The numerical parameters 204*a-c* can further define or describe a relationship between an input and an output for each of the components 206*a-c*. For example, a first numerical parameter 204*a* can be a friction factor, which can be representative of a change in pressure or flow rate as water flows through the valve. A second numerical parameter 204*b* can be a slope of pressure versus flow rate, where pressure can be a measurement of force per unit area and flow rate can be an amount of water pumped in a certain time frame. Additionally, a third numerical parameter 204*c* can be a slope of pressure to represent a change in pressure as water travels through the pipe or a section of the pipe. Additional examples of parameters can include temperature, slope of pressure loss at, for example, a bend in a pipe, or other suitable parameters.

The computer system 210 can further select sets of values 214 for each of the numerical parameters 204*a-c*. The sets of values 214 can extend below, within, and above the nominal ranges 212 for the numerical parameters 204*a-c*. Additionally, frequencies 216 of values in the sets of values 214 can peak within the nominal ranges 212 for the numerical parameters 204*a-c*. The digital model 202 can be executed on the computer system 210 with each value of the sets of values 214. For each value in the sets of values 214, the value can be input into the digital model 202 as the corresponding numerical parameter. In each execution of the digital model 202, nominal plant inputs 218 can be used and the other numerical parameters can be within respective nominal ranges 212. The nominal plant inputs 218 can be standard inputs for additional parameters in the digital model 202 or other suitable inputs for the digital model 202 associated with normal conditions in the industrial plant 208. The executions of the digital model 202 can enable analysis of the effect of normal and abnormal values of each of the numerical parameters 204*a-c*.

Additionally, the computer system 210 can, for each execution of the digital model 202, generate related outputs 220. The computer system 210 can further associate the sets of values 214 with the related outputs 220 of the digital model 202. Therefore, the related outputs 220 can be representative of the behavior of the digital model 202 as a result of inputting each value of the sets of values 214. The computer system 210 may also distinguish a first set of related outputs 224*a* from a second set of related outputs 224*b*. The first set of related outputs 224*a* can be associated with a first portion of the sets of values 214 within the nominal ranges 212 of the numerical parameters 204*a-c*. The second set of related outputs 224b can be associated with a second portion of the sets of values 214 above or below the nominal ranges 212. The computer system 210 can further distinguish between the sets of related outputs 224a-b by flagging the related outputs associated the first portion of the set of values 214, flagging the related outputs associated with the second portion of the set of values 214, or a combination thereof. The flagging may include marking, annotating, setting aside to save in a separate portion of the database, or otherwise differentiating between the sets of related outputs 224a-b.

The computer system 210 can also save the associations of related outputs 220 and the sets of values 214 in a database 222. The database 222 can comprise a lookup table, a file, relational database, or other suitable technique for storing data, which can provide an efficient means for searching the database 222 for the related outputs 220. In some examples, the database 222 can be further organized. For example, the second set of related outputs 224b can be saved in a separate portion of the database 222 than the first set of related outputs 224a. Additionally, the database 222 may group related outputs associated with the same numerical parameter, group related outputs for numerical parameters associated with components at high risk of exhibiting anomalous behavior, or otherwise organize the related outputs 220.

In a particular example, an anomalous output 221 can be observed from the industrial plant 208. The anomalous output 221 can be observed by the computer system 210 detecting a difference between a first output from the industrial plant 208 or a second output from the digital model 202 and a preferred output. The first output can be the anomalous output 221 and can be output by a pressure sensor associated with the pipe. The second output can be 202 can associated with inputting values in the nominal ranges 212 for the numerical parameters 204a-c and the nominal plant inputs 218 into the digital model 202. The pressure sensor can detect a significant decrease in pressure for the pipe. Therefore, because the third numerical parameter 204c associated with the pipe is within a nominal range while the real-world pipe is exhibiting anomalous behavior, the difference between the first output and the second output can be observed by the computer system 210.

In some examples, the computer system 210 can receive a threshold and can detect the anomalous output 221 based on the difference between the first output and the second output exceeding the threshold. The industrial plant 208 can exhibit a distribution of outputs due to uncertainty measurements associated with human error, machine error, or the like. The distribution of outputs can be reflected in the digital model 202 by the nominal ranges 212 for the numerical parameters 204a-c. Therefore, there can be an acceptable amount of difference between the first output and the second output. The threshold can be based on the acceptable amount of difference such that a difference between the first output and the second output exceeding the threshold can indicate that the first output is an anomalous output 221.

In response to observing the anomalous output 221, the computer system 210 can search the database 222 for the anomalous output 221. The search can be limited to outputs of the digital model 202 associated with inputting numerical parameters 204a-c that extend below or above the respective nominal ranges. For example, the search can be limited to the second set of related outputs 224b. In some examples, the computer system 210 can search the separate portion of the database 222 in which outputs associated with values outside the nominal ranges 212 can be saved. Additionally, the computer system 210 may interpolate between data in the database 222 to improve the efficiency of matching a related output to the anomalous output 221.

The computer system 210 can identify, via the search of the database 222, that the first numerical parameter 204a is associated with the anomalous output 221. For example, the valve can be incorrectly positioned, or broken, thereby causing a blockage in the pipe that was detected by the pressure sensor. The database can enable the first numerical parameter 204a to be identified efficiently. The computer system 210 can further display the first component 206a on a display device 226 as a graphic, picture, or other image. The display of the first component 206a can cause the first component 206 to be replaced or repaired.

Figure 3:
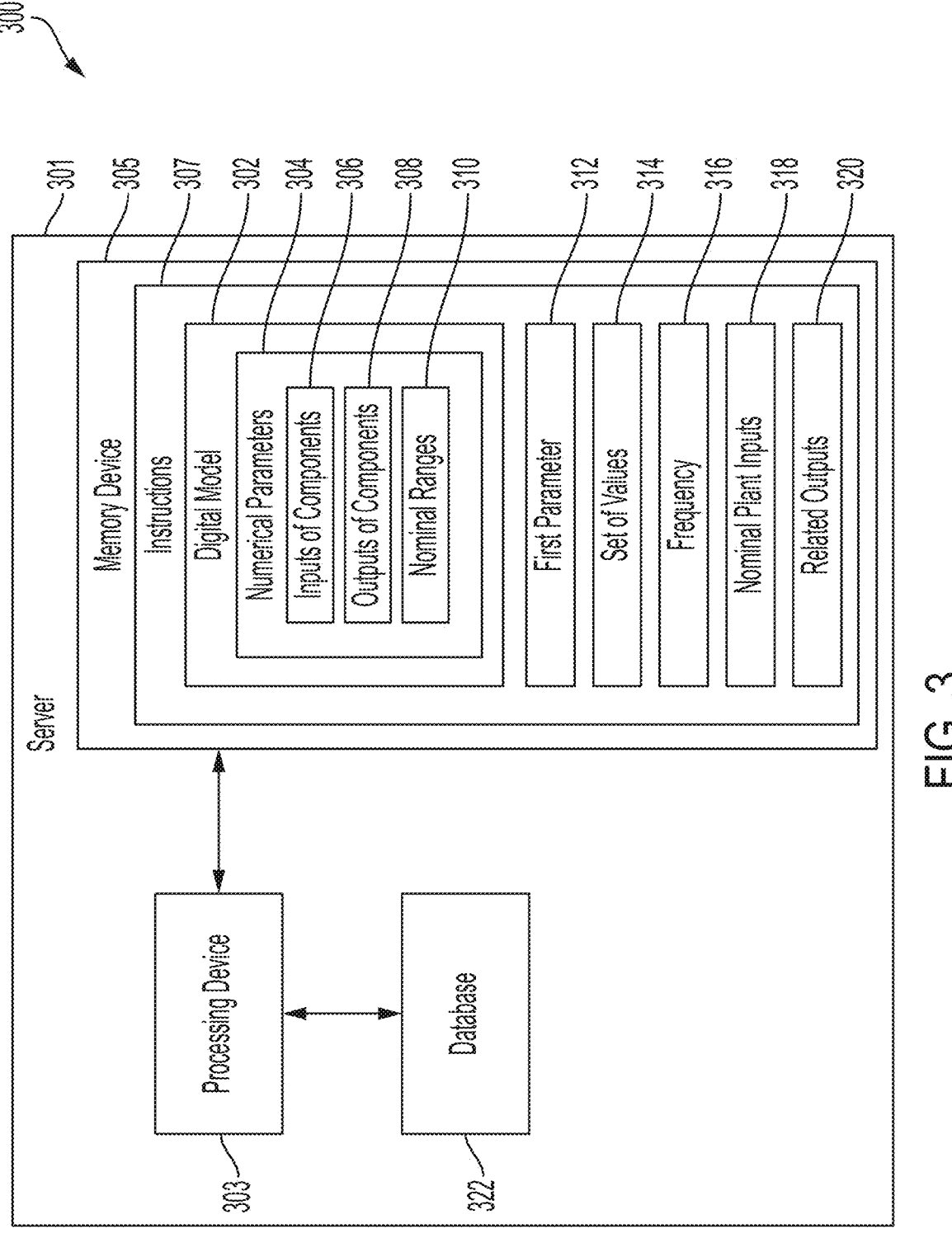
FIG. 3 is a block diagram of an example of a computing system for anomaly detection using root cause analysis in a probabilistic multi-component calibrated model according to one example of the present disclosure.

FIG. 3 is a block diagram of an example of a computing system 300 for anomaly detection using root cause analysis in a probabilistic multi-component calibrated model according to one example of the present disclosure. The computing system 300 includes a processing device 303 that is communicatively coupled to a memory device 305. In some examples, the processing device 303 and the memory device 305 can be part of the same computing device, such as the server 301. In other examples, the processing device 303 and the memory device 305 can be distributed from (e.g., remote to) one another.

The processing device 303 can include one processor or multiple processors. Non-limiting examples of the processing device 303 include a Field-Programmable Gate Array (FPGA), an application-specific integrated circuit (ASIC), or a microprocessor. The processing device 303 can execute instructions 307 stored in the memory device 305 to perform operations. The instructions 307 may include processor-specific instructions generated by a compiler or an interpreter from code written in any suitable computer-programming language, such as C, C++, C #, Java, or Python.

The memory device 305 can include one memory or multiple memories. The memory device 305 can be volatile or non-volatile. Non-volatile memory includes any type of memory that retains stored information when powered off. Examples of the memory device 305 include electrically erasable and programmable read-only memory (EEPROM) or flash memory. At least some of the memory device 305 can include a non-transitory computer-readable medium from which the processing device 303 can read instructions 307. A non-transitory computer-readable medium can include electronic, optical, magnetic, or other storage devices capable of providing the processing device 303 with computer-readable 30) instructions or other program code. Examples of a non-transitory computer-readable medium can include a magnetic disk, a memory chip, ROM, random-access memory (RAM), an ASIC, a configured processor, and optical storage.

The processing device 303 can execute the instructions 307 to perform operations. For example, the processing device 303 can provide a digital model 302 of an industrial plant. The digital model 302 can have numerical parameters 304 associated with components of the industrial plant. The numerical parameters 304 can describe relationships between inputs of components 306 and outputs of components 308 and the numerical parameters 304 can have nominal ranges 310. The processing device 303 can also select a set of values 314 for a first parameter 312 of the numerical parameters 304. The set of values 314 can extend below, within, and above the nominal range 310 of the first parameter 312. A frequency 316 of the set of values 314 can peak at value within the nominal range 310 of the first parameter 312. The processing device 303 can further execute the digital model 302 using each of the set of values 314. The executing can occur within nominal plant inputs 318 and while all numerical parameters 304 other than the first parameter 312 are within respective nominal ranges 310. Additionally, the processing device 303 can associate each of the set of values 314 with related outputs 320 of the digital model 302. The processing device 303 can distinguish related outputs 320 associated with values within the nominal range 310 of the first parameter 312 from related outputs 320 associated with values extending below or above the nominal range 310 of the first parameter 312. The processing device 303 can save the associations in a database 322.

Figure 4:
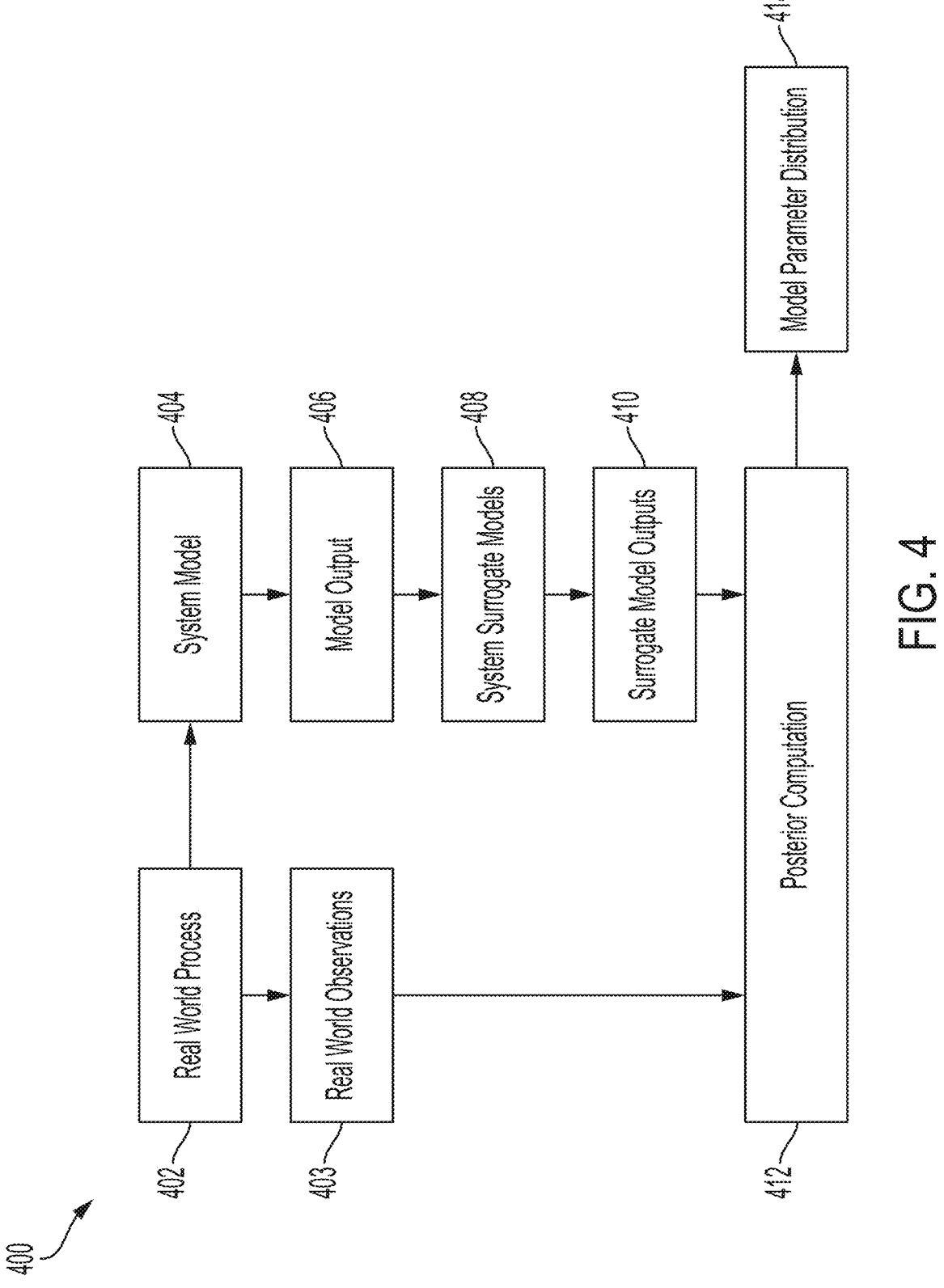
FIG. 4 is a block diagram of an example of a system for generating a probabilistic multi-component calibrated model according to one example of the present disclosure.

FIG. 4 is a block diagram of a system 400 for generating a probabilistic multi-component calibrated model according to one example of the present disclosure. The system 400 can be an offline system for generating the probabilistic multi-component calibrated model. The system 400 can determine model parameter distributions 414, which can be used to generate the probabilistic multi-component calibrated model.

The system 400 can include a real-world process 402, which can be associated with an industrial plant. For example, the real-world process 402 can be water distribution in a water distribution system. Additional examples of real-world processes can include metalworking in a metal manufacturing plant, chemical processes performed in chemical plants, oil refining in an oil refinery, electrical generation, or any other suitable process or system associated with an industrial plant. The system 400 can further acquire real-world observations from sensors or other data collection methods within the real-world process 402.

The system 400 can further include a system model 404, which can be generated based on prior distributions for parameters associated with the real-world process 402. The parameters can represent components of the real-world process 402 in the system model 404. For example, for water distribution, the components can be valves, pipes, pumps, etc. and the parameters can be pressure versus flow rate, friction factor, pressure loss, etc. The prior distributions can be estimated for the parameters based on historical data associated with the real-world process 402, data from a model or process similar to the real-world process 402, or other suitable data. The system 400 can execute the system model 404 with values in the prior distributions for the parameters to generate model output 406.

Additionally, the system 400 can generate one or more system surrogate models 408. For example, a number of the system surrogate models 408 can be equal to a number of parameters in the system model 404. The system surrogate models 408 can be executed to generate surrogate model outputs 410. The system surrogate models 408 can be used to improve an efficiency of performing posterior computations 412 by enabling multiple computations to be performed in parallel. The posterior computations 412 can be computations performed to update the prior distributions based on the real-world observations 403. In an example, the posterior computations 412 can involve updating a parameter in each of the system surrogate models 408 based on the real-world observations 403.

Therefore, the posterior computations 412 can be used to determine a model parameter distribution 414 for each of the parameters in the system model 404. The model parameter distributions 414 can be equal to the posterior distributions. The model parameter distributions 414 can be used to generate an accurate system model of the real-world process 402 (i.e., the probabilistic multi-component calibrated model). The model parameter distributions 414 can further be used in determining nominal ranges for the parameters, as discussed above.

Figure 5:
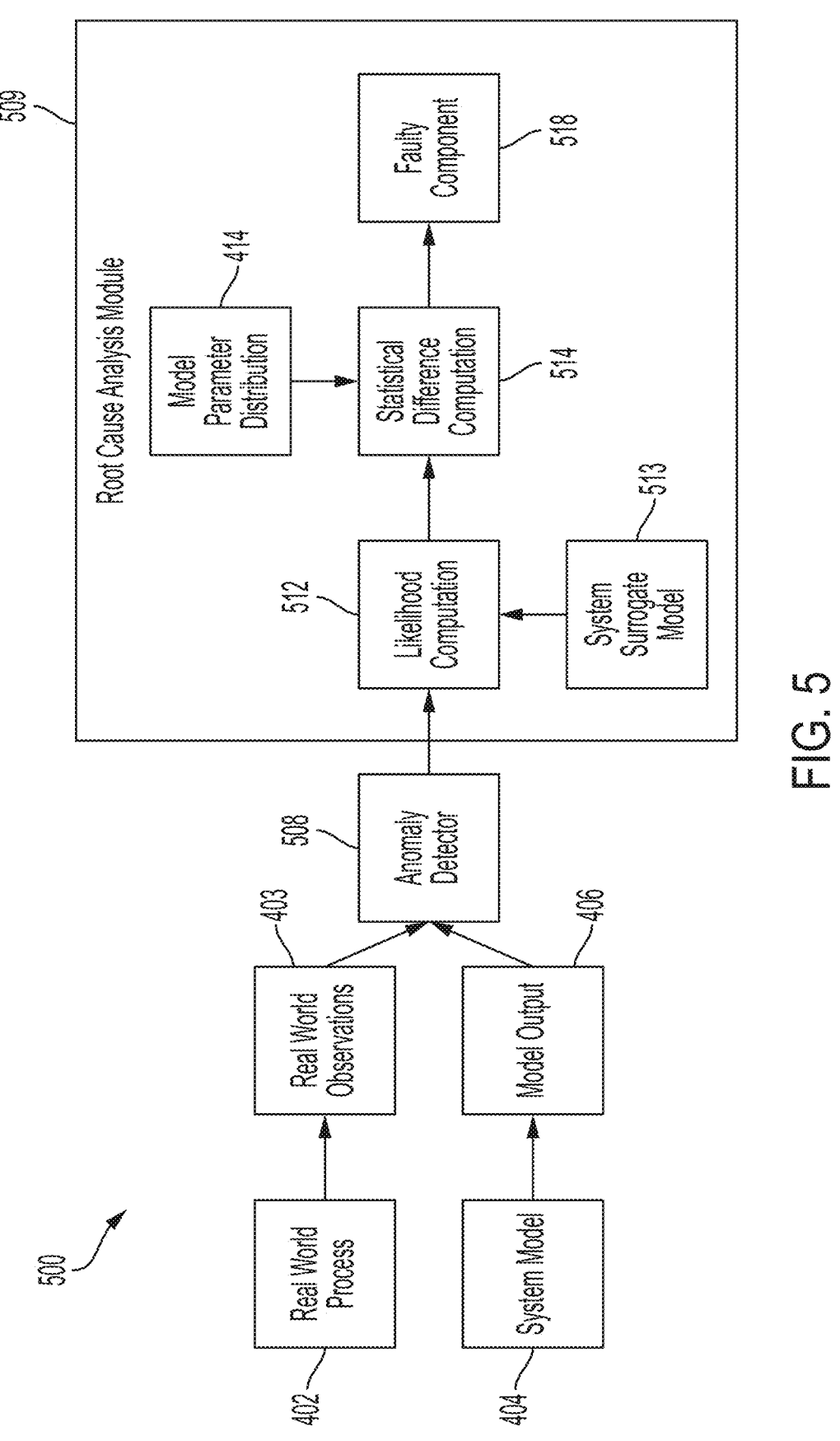
FIG. 5 is a block diagram of an example of a system for performing anomaly detection and root cause analysis according to one example of the present disclosure.

FIG. 5 is a block diagram of an example of a system 500 for performing anomaly detection and root cause analysis (RCA) according to one example of the present disclosure. The system 500 can be an online system for performing anomaly detection and RCA of a real-world process 402 using a system model 404, an anomaly detector 508, and an RCA module 509. The system 500 can be used subsequent to the system described in FIG. 4 to use model parameter distributions 414 to detect and identify anomalies in the real-world process 402.

The system 500 can include the anomaly detector 508 for comparing real-world observations 403 and model output 406 of a preferred value. The anomaly detector 508 can detect an anomaly by detecting that a difference between the real-world observations 403 and the model output 406 exceeds a threshold. The threshold can be a maximum acceptable difference based how much the model parameter distributions 414 can change the model output 406. In an example, the model output 406 can be a mean model output based on the model parameter distributions 414, and the threshold can indicate that the real-world observations exceed the acceptable distance from the mean model output, where the acceptable distance can be one standard deviation from the mean model output.

In response to the anomaly detector 508 detecting an anomaly, an RCA module 509 can execute operations to identify a faulty component 518. The RCA module 509 can perform a likelihood computation 512 in which likelihoods for each parameter can be updated based on the real-world observations 403. In some examples, system surrogate models 513 can be used by the RCA module 509 to improve an efficiency of performing the likelihood computations 512. The system surrogate models 513 can be used to perform multiple likelihood computations 512 in parallel. Additionally, the RCA module 509 can perform statistical difference computations 514. The statistical difference computations 514 can be differences between the updated likelihoods for each parameter and the model parameter distributions 414. The component associated with a parameter with a largest 20) statistical difference can be identified as the faulty component 518. The faulty component 518 can be displayed. In some examples, the system 500 may further display a diagnosis for the faulty component 518 to facilitate the faulty component 518 being repaired or replaced.

Figure 6:
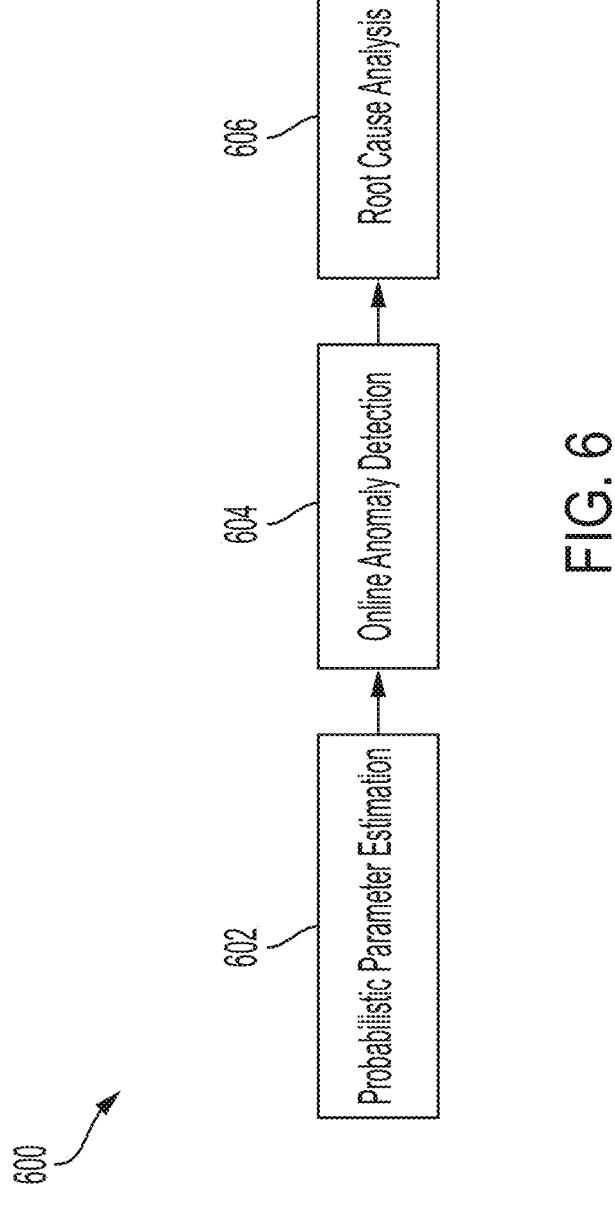
FIG. 6 is a flowchart of process for anomaly detection using root cause analysis in a probabilistic multi-component calibrated model according to one example of the present disclosure.

FIG. 6 is a flowchart of process 600 for anomaly detection using root cause analysis in a probabilistic multi-component calibrated model according to one example of the present disclosure. Aspects of FIG. 6 are discussed in reference to the components shown in FIG. 3. The probabilistic multi-component calibrated model can be a digital model 302 of an industrial plant.

At block 602, the processing device 303 can perform probabilistic parameter estimation. The probabilistic parameter estimation can be performed to provide numerical parameters 304 for the digital model 302. The probabilistic parameter estimation can be performed by determining prior distributions based on historical data for a system or process associated with the industrial plant or otherwise estimating data for the system or process. The prior distributions can be determined for each numerical parameter 304 in the digital model 302. Then, data received from sensors in the industrial plant can be used to update the prior distributions to generate posterior distributions. The posterior distributions can be used to create the digital model 302 with accurate numerical parameters 304 and can enable the digital model 302 to account for uncertainty measurements in the numerical parameter 304.

At block 604, the processing device 303 can perform online anomaly detection. An anomaly can be detected for a difference between a first output from the industrial plant and a second output from the digital model 302 of a smoothly running plant or a preferred value. In some examples, the anomaly can be detected based on the difference exceeding a threshold. The threshold can be based on the acceptable amount of difference due to the uncertainty measurements. Thus, the difference exceeding the threshold can indicate that the first output is associated with an anomaly.

At block 606, the processing device 303 can perform root cause analysis (RCA). In response to detecting the anomaly, RCA can be performed to update the posterior distributions for each numerical parameter 304 based on the first output. The updated posterior distributions can also be referred to as likelihoods. The RCA module may further determine statistical differences between the updated posterior distributions and the posterior distributions for each parameter. A component associated with a parameter with a largest statistical difference can be identified as the component causing the anomaly.

Additionally, in some examples, a database 322 can be generated with predefined outputs of the digital model 302. Therefore, RCA can be performed by automatically searching the database 322 for a predefined output that is sufficiently close to the first output. The RCA can further identify, based on associations in the database, a parameter associated with the predefined output. The component associated with the parameter can be identified as the component causing the anomaly.

Figure 7:
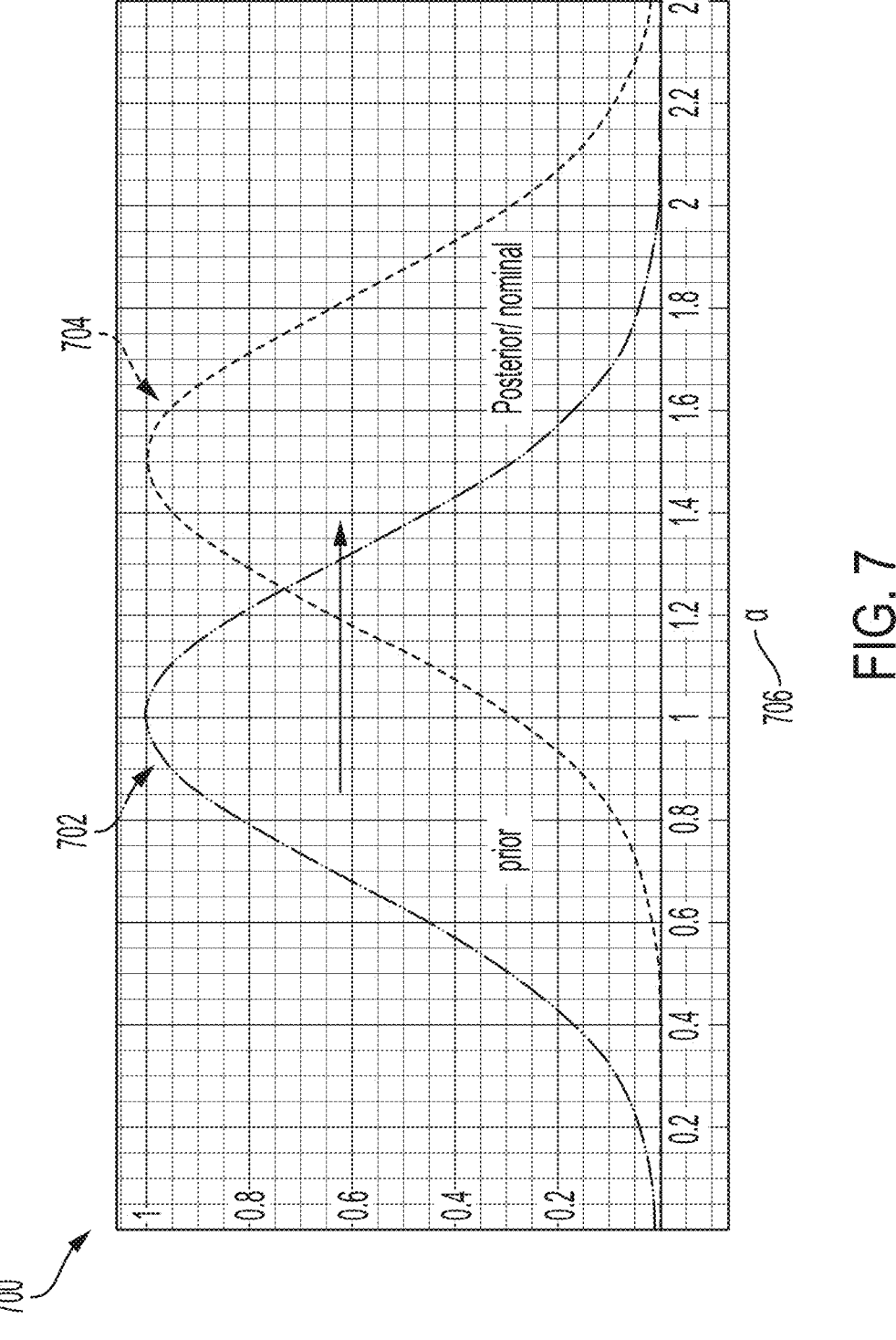
FIG. 7 is an example of a graph for probabilistic parameter estimation according to one example of the present disclosure.

FIG. 7 is an example of a graph 700 for probabilistic parameter estimation according to one example of the present disclosure. The graph 700 can be the probabilistic parameter estimation performed for a parameter representative of one or more components. The one or more components can be associated with a process in an industrial plant. For example, the process can be the flow of water to a destination via a water distribution system. The process can include components such as pipes, pumps, valves, etc. The graph 700 can be generated for a particular parameter representing a particular component. For example, the component can be a valve and the parameter can be a friction factor.

The graph 700 can include a prior curve 702. The prior curve 702 can be an estimated probability distribution for the friction factor. The prior curve 702 can be generated prior to receiving data for the process in the industrial plant. Thus, the prior curve 702 can be estimated based on historical data from a similar digital model or process, based on average friction factors for valves, or other suitable data indicative of the friction factor. The graph 700 can further include a posterior curve 704 (i.e., nominal curve). The posterior curve 704 can represent an adjustment to the prior curve 702 based on data collected for the process. The data can be collected by sensors embedded in the process. For example, one or more pressure sensors located proximate to the valve can be used to generate the data used to produce the posterior curve for the friction factor.

Additional graphs consisting of prior curves and posterior curves can be generated for each of the parameters representing components in the digital model. The posterior curves can be used to determine nominal ranges for each of the parameters. Additionally, in some examples, the posterior curves for parameters can be used in estimating and generating the prior curves for associated parameters. For example, the friction factor for the valve can be a first friction factor and a second friction factor may be determined for a pipe in which the valve is positioned. The first friction factor can be used in estimating a second prior curve for the second friction factor. Additionally, the sensors used to generate data for the posterior curve 704 may also be used in generating data for a second posterior curve for the second friction factor. In some examples, additional sensor data, historical data, or other suitable information can be used to differentiate between components and generate different posterior curves.

Figure 8:
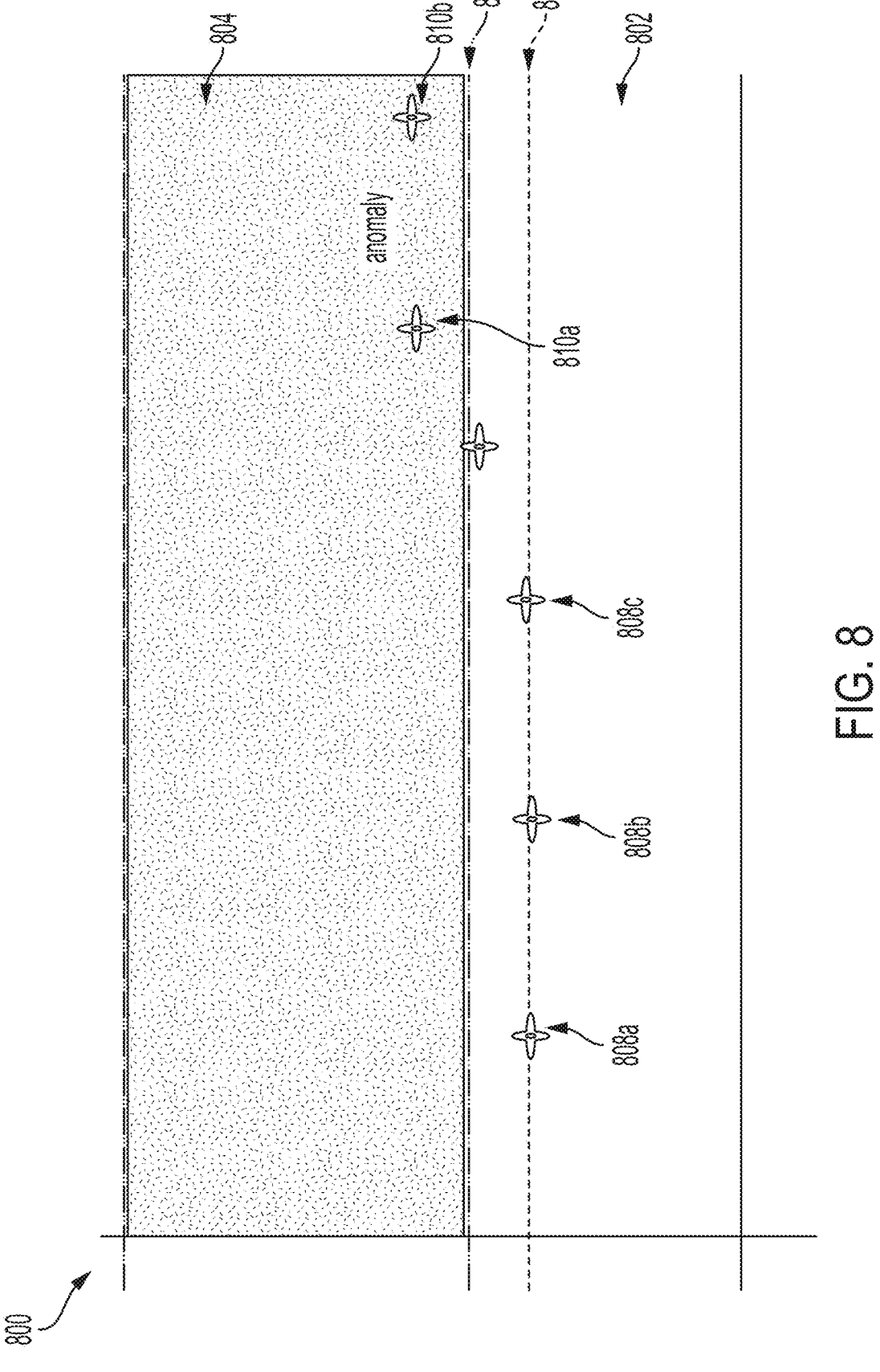
FIG. 8 is an example of a graph for anomaly detection according to one example of the present disclosure.

FIG. 8 is an example of a graph 800 for anomaly detection according to one example of the present disclosure. The graph 800 can include a nominal area 802 and anomaly area 804. The graph 800 can further include outputs from an industrial plant, in which a first set of the outputs can be nominal outputs 808a, 808b, and 808c and a second set of the outputs can be anomalous outputs 810a and 810b. Additionally, a first boundary 806a of the graph 800 can represent a mean or ideal value for outputs or the first boundary 806a can be an upper limit below which can be a nominal range for the outputs. The second boundary 806b can be a lower limit above which the outputs can be in a range indicative of anomalous behavior for the industrial plant. The boundaries 806a and 806b can be based on outputs of a digital model of the industrial plant. Therefore, the nominal outputs 808a-c can indicate that the outputs of the industrial plant are similar to the outputs of the digital model. The anomalous outputs 810a-b can indicate that a difference between the outputs of the industrial plant and the outputs of the digital model exceeds a threshold. The threshold can be represented by the space between the boundaries 806a and 806b.

Figure 9A:
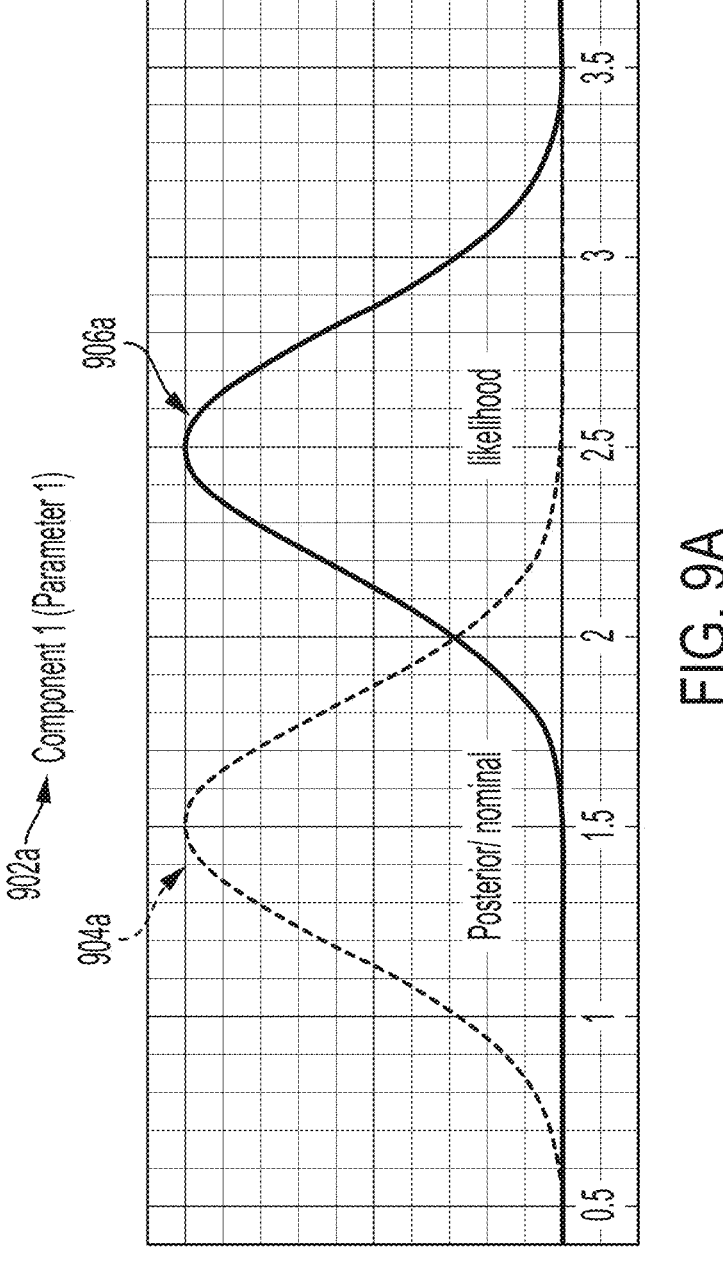
FIG. 9A is an example graph that can be used in root cause analysis according to one example of the present disclosure.
Figure 9B:
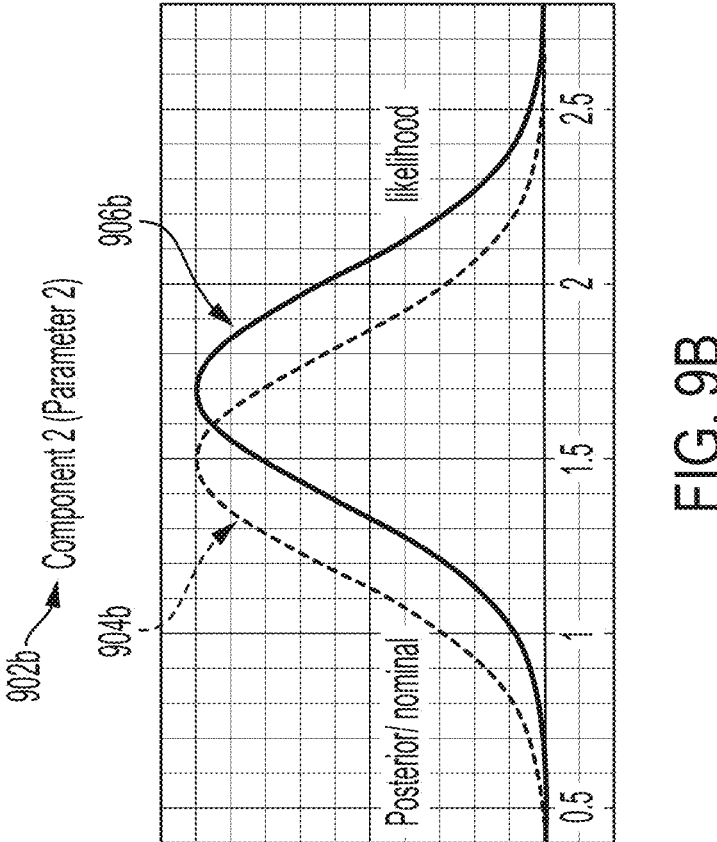
FIG. 9B is an example graph that can be used in root cause analysis according to one example of the present disclosure.

FIGS. 9A-9B are examples of graphs 902a and 902b that can be used in root cause analysis according to one example of the present disclosure. In FIG. 9A, a first graph 902a can represent a first parameter from a digital model of an industrial plant. The first graph 902a can have a first posterior distribution curve 904a, which can be estimated for the first parameter based on historical or estimated data and data from sensors in the industrial plant. The first graph 902a can further have a first likelihood curve 906a, which can be an updated posterior distribution curve based on new data from the industrial plant. The first likelihood curve 906a can be calculated in response to an anomalous behavior detected in the industrial plant.

Similarly, in FIG. 9B a second graph 902b can represent a second parameter from the digital model. The second graph 902b can have a second posterior distribution curve 904b, which can be estimated for the second parameter based on historical or estimated data and data from sensors in the industrial plant. The second graph 902b can further have a second likelihood curve 906b, which can be an updated posterior distribution curve based on the new data from the industrial plant. The second likelihood curve 906b can also be calculated in response to the anomalous behavior detected in the industrial plant.

Additionally, a statistical difference between the posterior distribution curves 904a and 904b and the likelihood curves 906a and 906b can be calculated. As depicted by the distance between the curves in the graphs 902a and 902b, the statistical difference for the first parameter can be larger than the statistical difference for the second parameter. Therefore, a component associated with the first parameter can be the component causing the anomalous behavior.

Figure 10:
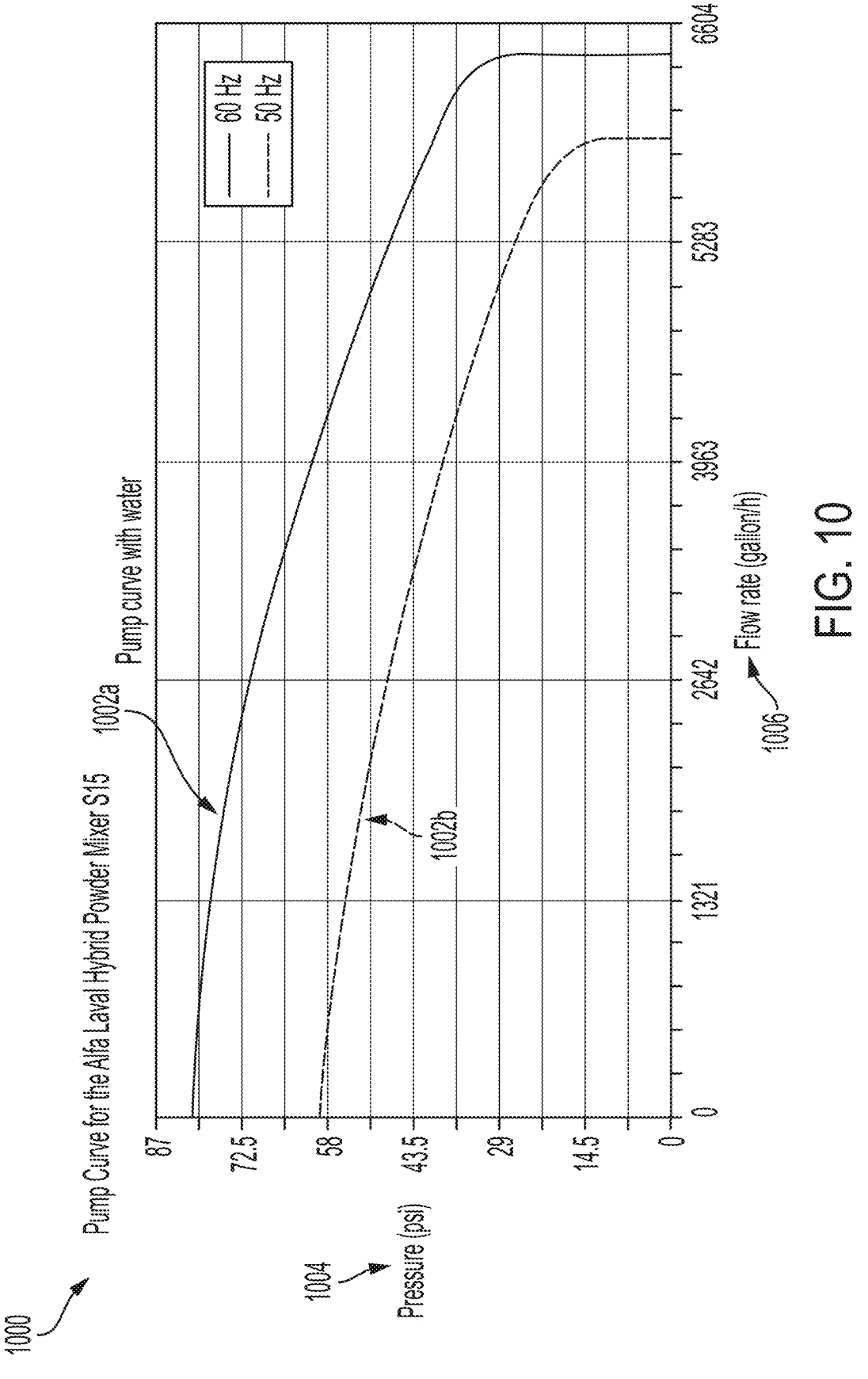
FIG. 10 is an example of a numerical parameter according to one example of the present disclosure.

FIG. 10 is an example of a graph 1000 for a numerical parameter according to one example of the present disclosure. The numerical parameter can be the slope of pressure 1004 versus flow rate 1006. The pressure 1004 can be a measurement of force per unit area and flow rate 1006 can be an amount of water flowing through an area over a given timeframe. Therefore, a first numerical parameter can be a slope of the first curve 1002 and a second numerical parameter can be a slope of the second curve 1002b. In an example, the numerical parameter can be measured from a pump in water distribution system and can further represent the pump in a digital model of the water distribution system.

FIG. 11 is a flowchart of a process 1100 for troubleshooting a process in an industrial plant according to one example of the present disclosure. In some examples, the processing device 303 can implement some or all of the steps shown in FIG. 11. Other examples can include more steps, fewer steps, different steps, or a different order of the steps than is shown in FIG. 11. The steps of FIG. 11 are discussed below with reference to the components discussed above in relation to FIG. 3.

At block 1102, the processing device 303 can provide, on a computing system 300, a digital model 302 of an industrial plant, the digital model 302 having numerical parameters 304 associated with components of the industrial plant. Each of the numerical parameters 304 can describe relationships between inputs of components 306 and outputs of components 308. Additionally, each of the numerical parameters 304 can have nominal ranges 310. In some examples, the nominal ranges 310 can be based on posterior distributions or likelihoods that can be calculated for the numerical parameters 304 based on estimated or historical data and based on data collected from sensors in the industrial plant. The numerical parameters 304 can have nominal ranges 310 to account for uncertainty measurements and to increase the accuracy of the digital model 302.

At block 1104, the processing device 303 can select a set of values 314 for a first parameter 312 of the numerical parameters 304. The set of values 314 can extend below, within, and above a nominal range of the first parameter 312. Additionally, a frequency 316 of values in the set of values 314 can peak at values within the nominal range of the first parameter 312.

At block 1106, the processing device 303 can execute the digital model 302 using each of the selected set of values. The executing of the digital model 302 can occur with nominal plant inputs 318 and while all numerical parameters 304 other than the first parameter 312 are within respective nominal ranges 310. Therefore, the digital model 302 can be executed with a variety of values for the first parameter 312 while additional parameters or other suitable aspects of the digital model 302 can be kept constant, which can enable analysis of an effect of the first parameter 312 on an output of the digital model 302.

At block 1108, the processing device 303 can associate each of the selected set of values 314 with a related output of the executed digital model 302. A number of related outputs 320 can be equal to a number of values in the set of values 314. The related outputs can be dependent on the first parameter 312 due to the execution of the digital model 302 occurring with the nominal plant inputs 318 and the other numerical parameters 304 within the respective nominal ranges 310.

At block 1110, the processing device 303 can distinguish related outputs 320 associated with values within the nominal range of the first parameter 312 from related outputs 320 associated with values extending below or above the nominal range for the first parameter. The distinguishing can include flagging the related outputs 320 associated with values within the nominal range of the first parameter 312 or flagging the related outputs 320 associated with values extending below or above the nominal range for the first parameter 312. The flagging may include marking, annotating, or otherwise differentiating between the related outputs 320.

At block 1112, the processing device 303 can save the associations in a database 322. The database 322 can be a lookup table, a file, or a relational database. The associations can be organized in the database 322 to facilitate efficient access to the related outputs 320. In some examples, the database 322 can have more than one portion for organizing the associations. Therefore, the processing device 303 may save the related outputs 320 associated with values within the nominal range of the first parameter 312 or the related outputs 320 associated with values extending below or above the nominal range in a separate portion of a database 322. Additionally, the flagging may include setting aside to save in the separate portion of the database 322.

At block 1114, the processing device 303 can observe an anomalous output from the industrial plant. The anomalous output can be observed based on a difference between an output from the digital model 302 and an output from the industrial plant exceeding a threshold. The threshold can be a maximum acceptable difference between the output from the digital model 302 and the output from the industrial plant and may be based on the nominal ranges 310.

At block 1116, the processing device 303 can search the database 322 for the anomalous output. The searching can be limited to related outputs 320 associated with numerical parameters that extend below or above the respective nominal ranges 310. The searching may include interpolating between the data in the database 322 to match the anomalous output to a related output.

At block 1118, the processing device 303 can identify the first parameter as being associated with the anomalous output. The processing device 303 can identify the first parameter 312 based on a related output for the first parameter 312 being the closest match to the anomalous output. The processing device 303 may further identify a component of the industrial plant associated with the first parameter 312.

At block 1120, the processing device 303 can display the component of the industrial plant based on the identifying. The component can be displayed to an operator or other suitable user associated with the industrial plant. Additionally, the display of the component can cause the component to be repaired or replaced. In some examples, the processing device 303 can further display a diagnosis of a problem with the component to facilitate the component being repaired or replaced. For example, the operator can adjust, repair, or initiate a replacement for the component based on the display.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow; are approximate, not exact. They are intended to have a reasonable range that is consistent with the functions to which they relate and with what is customary in the art to which they pertain. "About" in reference to a temperature or other engineering units includes measurements or settings that are within ±1%, ±2%, ±5%, ±10%, or other tolerances of the specified engineering units as known in the art.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of troubleshooting a process in an industrial plant, the method comprising:
   providing, on a computer system, a digital model of an industrial plant, the digital model having numerical parameters associated with components of the industrial plant, each numerical parameter describing a relationship between an input and an output of a component;
   executing a surrogate model of the digital model to generate a model parameter distribution for each numerical parameter, each model parameter distribution determining a nominal range of the respective numerical parameter;

selecting a set of values for a first parameter of the numerical parameters, the set of values extending below, within, and above the determined nominal range of the first parameter, a frequency of the selected set of values peaking at values within the nominal range of the first parameter;
   executing the digital model using each of the selected set of values, the executing occurring with nominal plant inputs and while all numerical parameters other than the first parameter are within respective nominal ranges;
   associating each of the selected set of values with a related output of the executed digital model;
   distinguishing i) related outputs associated with values within the nominal range of the first parameter from ii) related outputs associated with values extending below or above the nominal range of the first parameter;
   saving the associations in a database;
   observing an anomalous output from the industrial plant;
   searching the database for the anomalous output, the searching limited to outputs associated with numerical parameters that extend below or above the respective nominal ranges;
   identifying the first parameter as being associated with the anomalous output;
   displaying a component of the industrial plant based on the identifying; and
   repairing or replacing the component.

2. The method of claim 1 wherein the distinguishing includes flagging the i) related outputs associated with the values within the nominal range or flagging the ii) related outputs extending below or above the nominal range.

3. The method of claim 2 wherein the flagging includes marking, annotating, or setting aside to save in a separate portion of the database.

4. The method of claim 1 wherein the distinguishing includes saving in a separate portion of the database.

5. The method of claim 1 further comprising:
   interpolating between data in the database to match the anomalous output.

6. The method of claim 1 wherein the components of the industrial plant are selected from the group consisting of a controller, a sensor, an actuator, a fluid pump, a valve, and a pipe.

7. The method of claim 1 wherein at least one of the numerical parameters is a pressure versus flow slope.

8. The method of claim 1 wherein the database comprises a lookup table, a file, or a relational database.

9. A non-transitory machine-readable tangible medium embodying information indicative of instructions for causing one or more machines to perform operations comprising:
   providing, on a computer system, a digital model of an industrial plant, the digital model having numerical parameters associated with components of the industrial plant, each numerical parameter describing a relationship between an input and an output of a component;
   executing a surrogate model of the digital model to generate a model parameter distribution for each numerical parameter, each model parameter distribution determining a nominal range of the respective numerical parameter;
   selecting a set of values for a first parameter of the numerical parameters, the set of values extending below, within, and above the determined nominal range of the first parameter, a frequency of the selected set of values peaking at values within the nominal range of the first parameter;

executing the digital model using each of the selected set of values, the executing occurring with nominal plant inputs and while all numerical parameters other than the first parameter are within respective nominal ranges;

associating each of the selected set of values with a related output of the executed digital model;

distinguishing i) related outputs associated with values within the nominal range of the first parameter from ii) related outputs associated with values extending below or above the nominal range of the first parameter;

saving the associations in a database;

observing an anomalous output from the industrial plant;

searching the database for the anomalous output, the searching limited to outputs associated with numerical parameters that extend below or above the respective nominal ranges;

identifying the first parameter as being associated with the anomalous output;

displaying a component of the industrial plant based on the identifying; and repairing or replacing the component.

10. The medium of claim 9 wherein the distinguishing includes flagging the i) related outputs associated with the values within the nominal range or flagging the ii) related outputs extending below or above the nominal range.

11. The medium of claim 10 wherein the flagging includes marking, annotating, or setting aside to save in a separate portion of the database.

12. A system for troubleshooting a process in an industrial plant, the system comprising:

a memory; and at least one processor operatively coupled with the memory and executing program code from the memory for:

providing, on a computer system, a digital model of an industrial plant, the digital model having numerical parameters associated with components of the industrial plant, each numerical parameter describing a relationship between an input and an output of a component;

executing a surrogate model of the digital model to generate a model parameter distribution for each numerical parameter, each model parameter distribution determining a nominal range of the respective numerical parameter;

selecting a set of values for a first parameter of the numerical parameters, the set of values extending below, within, and above the determined nominal range of the first parameter, a frequency of the selected set of values peaking at values within the nominal range of the first parameter;

executing the digital model using each of the selected set of values, the executing occurring with nominal plant inputs and while all numerical parameters other than the first parameter are within respective nominal ranges;

associating each of the selected set of values with a related output of the executed digital model;

distinguishing i) related outputs associated with values within the nominal range of the first parameter from ii) related outputs associated with values extending below or above the nominal range of the first parameter;

saving the associations in a database;

observing an anomalous output from the industrial plant;

searching the database for the anomalous output, the searching limited to outputs associated with numerical parameters that extend below or above the respective nominal ranges;

identifying the first parameter as being associated with the anomalous output;

displaying a component of the industrial plant based on the identifying; and repairing or replacing the component.

13. The system of claim 12 wherein the distinguishing includes flagging the i) related outputs associated with the values within the nominal range or flagging the ii) related outputs extending below or above the nominal range.

14. The system of claim 13 wherein the flagging includes marking, annotating, or setting aside to save in a separate portion of the database.

* * * * *